June 20, 1950
A. H. PFUND
WATER-RESISTANT COMPOUND LENS
TRANSPARENT TO INFRARED
Filed Jan. 9, 1947
2,512,257
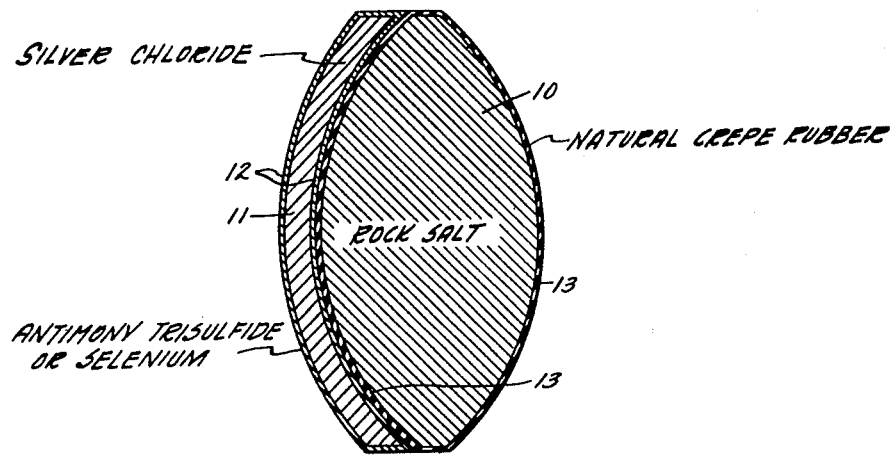
INVENTOR.
August H. Pfund
BY Wade Koonty and
Chester Tietig
ATTORNEYS Patented June 20, 1950

2,512,257

UNITED STATES PATENT OFFICE 2,512,257

WATER-RESISTANT COMPOUND LENS TRANSPARENT TO INFRARED

August Herman Pfund, Baltimore, Md., assignor to the United States of America as represented by the Secretary of War Application January 9, 1947, Serial No. 721,078

4 Claims. (Cl. 88—57)

The invention described herein may be manufactured and used by or for the Government for governmental purposes without payment to me of any royalty thereon.

This invention relates to water-resistant compound lenses for work demanding infra-red-transparent lenses for outdoor use. Such lenses are used both in aerial photography and for guiding heat-seeking missiles. The term "lens" as here used, is broad enough to cover 180° divergence, so that a flat plate or window is within the scope of the term.

One object of the invention is to make a lens of the character described that will be resistant for more than two hours against water in drop form as well as in vapor form.

Another object is to provide a lens or window that will be substantially entirely transparent to infra-red rays up to 12 mu in wave length and which will retain this transparency for years of its intended use, provided water drops do not reach it.

Another object is to provide a method for protecting rock salt plates or lenses against water while still retaining their infra-red transparency.

Another object is to provide a method for light-proofing silver chloride lenses against ultraviolet rays while still retaining their infra-red transparency for rays up to 12 mu in wave length.

Another object is to provide a method for joining rock salt and silver chloride lenses.

In the drawing 10 is a lens of rock salt and 11 is a lens of silver chloride. 12 is a coating of antimony tri-sulfide ($Sb_2S_3$) or of amorphous selenium ($Se_2$). Such coating is applied to a dry, polished AgCl lens, which is free from grease, by vacuum distillation. The coating material is volatilized in a high vacuum to which the AgCl lens is also subjected, so that the evaporated $Sb_2S_3$ or $Se_2$ will condense upon the cool lens. The deposition is continued until the lens becomes a deep orange or red color by transmitted light. A silver chloride lens so protected will not turn black after several hours exposure to a mercury arc lamp of ordinary intensity.

The rock salt lens 10 also has a coating 13. It is applied by the addition of a few drops of a solution known as Stock Solution A, the preparation and composition of which is about to be described. It is adapted to act as a cement as well as a water-resisting compound, thereby insuring the adhesion of the AgCl lens 11 to the rock salt lens 10. The cement or coating 13 is squeezed out to a very thin layer by using a glass tube as a roller. The two lenses are then brought together before the cement solidifies. It is also permissible to coat the $Sb_2S_3$ or $Se_2$ coated AgCl lens with the cement 13 before bringing the lenses together, provided the excess coating material is squeezed out when the lenses are brought together.

Stock Solution A

Some pale natural crepe-rubber is melted down in a crucible. The resultant dark, viscous mass remains fluid even at room temperature. To remove solid particles, some benzene is added. From this solution, the solid particles settle out. The liquid is then decanted. This liquid material is applied to the rock-salt lens 10 and the latter is then heated to 60°–70° C. to drive off the benzene. After cooling to room temperature, the AgCl lens or its equivalents, which will now be disclosed, are mounted on the rock-salt lens as previously described.

Equivalents of the silver chloride lens

*Equivalent A.*—The rock salt lens 10 is first protected on its edges by coating them with varnish, made by the interaction of glycerol and phthalic anhydride, and which is an alkyd type resin varnish of the grade used to seal evacuated spaces and is made by the General Electric Company. Then a sheet of synthetic resin of the kind made by polymerizing ethylene with vinyl acetate (E. I. DuPont Co.) is applied. The synthetic resin sheet is preferably 0.025 mm. thick. Chemically it is believed to be a polyethylene-oxide. The sheet is intended to project beyond the edge of the circular rock salt lens by 1 to 2 mm. so that when a close-fitting brass ring having an internal shoulder is slipped over the compound lens, the sheet is held firmly in place.

*Equivalent B.*—A sheet of partially saturated rubber hydrochlorides (Goodyear Tire and Rubber Co.) of 0.02 mm. thickness is substituted for the synthetic resin film in the preceding paragraph. The procedure is the same.

*Equivalent C.*—There is prepared a saturated solution of Baker's paraffin (M. P. 60°–68° C.) in benzene at a temperature of 30° C. Of this solution 60 parts are added to 40 parts of self-curing cement (Miller Rubber Co., Akron, Ohio) of the type which contains a vulcanization accelerator capable of vulcanizing the rubber at ordinary temperatures. If flakes of paraffin appear, more benzene is added to form a homogeneous solution. Some of the liquid known as Stock Solution B is poured on the horizontal top surface of a polished rock-salt plate, mounted axially on the vertical shaft of an electric motor. The speed of rotation is the lowest (less than 10 per second) which will yield a flat layer of liquid at the center of the plate. This speed is maintained for about 20 seconds (to give the benzene an opportunity to evaporate somewhat), whereupon the speed is increased greatly to fling off the thick layer of liquid at the edge. The rock-salt plate and coating are laid on a cold metal plate which is heated gradually to a temperature of about 120° C., when the system is laid on a stone slab and is allowed to cool to room temperature slowly. Since a single coat does not offer adequate protection, a second, and possibly, a third coat must be applied. To be sure, if one waits 5-6 days, the self-vulcanizing rubber will have become insoluble in benzene so that a second coat may be flowed on the first without dissolving the latter. To avoid so great a delay, an extremely thin film of nitrocellulose is spread over the top of the first coat. This is accomplished by allowing a drop of a dilute solution of nitrocellulose in amyl acetate to spread out on a water-surface. When the volatiles have evaporated, the film should show brilliant first-order interference colors. The film is lifted off the water by means of a square metal plate measuring 3 x 3 inches, with a circular central hole 2" in diameter. While the rock-salt plate is still very hot after the first heating, but below the decomposition of nitrocellulose, the dry nitrocellulose film is laid on the coating so that no air-bubbles are formed. When this system has cooled down to room temperature, a second coat of stock solution B may be applied. It is to be emphasized that the total thickness of coating ought to be no less than 0.03 mm. After the last coat has been applied, a final layer of nitrocellulose may be applied to improve the optical polish of the surface. Since straight nitrocellulose frills upon prolonged exposure to saturated water-vapor, it is advisable to add a little paraffin to the nitrocellulose solution from which the last film is formed.

Films thus formed protect rock-salt against saturated water-vapor for more than 24 hours, and against water-drops for more than two hours. The overall transmission in the wave-length interval 8-12 mu is better than 70 per cent.

The equivalents are preferred in the same order that they are discussed.

The invention claimed is:

1. In combination, an ordinarily water soluble, infra-red transparent lens having an infra-red transparent rubber coating of extreme thinness, an infra-red transparent lens having an infra-red transparent, ultra-violet-opaque coating, said lens being cemented together by means of said rubber coating, the combined lenses being resistant to water in drop form for more than two hours.

2. A compound lens resistance to water and substantially transparent to infra-red rays which comprises two lenses of different composition, each of said lenses coated with a water-resistant substance, substantially transparent to infra-red rays, at least one of said lenses being coated with a coating material of said nature which is also a cement, said lenses being joined together by the action of said cement.

3. A compound lens resistant to water and substantially transparent to infra-red rays which comprises a rock-salt lens, a water resistant infra-red-transparent coating on said lens, said coating being of a cementitious nature, a silver chloride lens, a water resisting, substantially infra-red-transparent and ultra-violet-protective coating on said lens, the silver chloride lens and the rock-salt lens being joined together by the cementing action of the coating on said rock-salt lens.

4. A compound lens resistant to water and substantially transparent to infra-red rays which comprises a rock-salt lens, a coating thereon comprising the solid-free composition produced by melting natural pale crepe rubber, a silver chloride lens, a coating thereon to protect said lens from water and ultra-violet rays, said rock salt lens and said silver chloride lens being joined together by the adhesive action of the rubber coating on said rock-salt lens.

AUGUST HERMAN PFUND.

REFERENCES CITED

The following references are of record in the file of this patent:

UNITED STATES PATENTS

| Number | Name | Date |
| --- | --- | --- |
| 725,094 | Kimberlin | Apr. 14, 1903 |
| 1,541,407 | Spangenberg | June 9, 1925 |
| 1,954,055 | Macht | Apr. 10, 1934 |
| 1,989,632 | Calvert | Jan. 29, 1935 |
| 2,022,479 | Randall | Nov. 26, 1935 |
| 2,085,437 | Michelssen | June 29, 1937 |
| 2,164,981 | Alderfer | July 4, 1939 |
| 2,168,221 | Land | Aug. 1, 1939 |
| 2,258,991 | McNally | Oct. 14, 1941 |
| 2,282,677 | Rayton | May 12, 1942 |
| 2,301,456 | Sabine | Nov. 10, 1942 |
| 2,338,234 | Dimmick | Jan. 4, 1944 |
| 2,400,139 | Roland | May 14, 1946 |
| 2,410,733 | Hewlett | Nov. 5, 1946 |
| 2,420,956 | Kremers et al. | May 20, 1947 |

OTHER REFERENCES

"The New Plastics," by Simonds, Bigelow & Sherman, May 1945, D. Van Nostrand Co., Inc., pages 20 and 21.